L. N. CRICHTON.
SYSTEM OF ELECTRICAL TRANSMISSION AND DISTRIBUTION.
APPLICATION FILED DEC. 13, 1912.

1,292,584.

Patented Jan. 28, 1919.
4 SHEETS—SHEET 1.

WITNESSES:
Ira R. Morrison
Ernest Gilgen

INVENTOR:
Leslie N. Crichton

L. N. CRICHTON.
SYSTEM OF ELECTRICAL TRANSMISSION AND DISTRIBUTION.
APPLICATION FILED DEC. 13, 1912.

1,292,584.

Patented Jan. 28, 1919.
4 SHEETS—SHEET 2.

WITNESSES:
Ira R Morrison
Ernest Gilgen

INVENTOR:
Leslie N Crichton

UNITED STATES PATENT OFFICE.

LESLIE N. CRICHTON, OF SALT LAKE CITY, UTAH, ASSIGNOR TO WESTINGHOUSE ELECTRIC AND MANUFACTURING COMPANY, A CORPORATION OF PENNSYLVANIA.

SYSTEM OF ELECTRICAL TRANSMISSION AND DISTRIBUTION.

1,292,584.　　　　　　　Specification of Letters Patent.　　　Patented Jan. 28, 1919.

Application filed December 13, 1912. Serial No. 736,603.

*To all whom it may concern:*

Be it known that I, LESLIE N. CRICHTON, a citizen of the United States, residing at Salt Lake City, in the county of Salt Lake and State of Utah, have invented certain new and useful Improvements in Systems of Electrical Transmission and Distribution, of which the following is a specification.

The object of my invention is to prevent accidental interruptions to service on electrical transmission and distribution systems, particularly those systems which consist of a network of extra high voltage lines. It consists of a combination of relays and other apparatus so arranged that a short circuit or ground on one section of a network will cause that section to be automatically separated from the rest of the network by means of circuit breakers.

Heretofore it has been impossible except in a few special cases to protect a very complicated system employing a network of three phase feeders from the effects of short circuits. Where automatic sectionalizing is attempted, relays are usually connected to current and potential transformers on all the circuits to be protected. When a relay operates it closes a contact in a tripping circuit which trips open the circuit breaker to which it is connected. Inverse time element overload relays and reverse power relays have been employed. The former kind has a limited application theoretically and much more limited practically because of its inherent inability to determine the location of a short circuit. The latter relay, as usually constructed, is based on the wattmeter principle and is not successful, because power does not necessarily flow toward a short circuit and the amount of power flow is not a criterion of the severity of a short circuit; hence, the reverse power relay can not positively locate the position of a short circuit nor can a number of reverse power relays on the same network discriminate in their action. Another method of cutting out short circuits is to run all feeders in duplicate with automatic devices at each end for cutting out the bad feeder, such automatic devices operating on the theory that in case of a short circuit on one feeder, it will carry more current than its mate. This scheme, while often serviceable, does not have a general application to networks.

In the past, grounded conductors have frequently been the cause of damage and interruptions on systems with either grounded or ungrounded neutrals. If the system is equipped with satisfactory relays and circuit breakers, there is an advantage in having the neutral grounded because a grounded conductor is then equivalent to a short circuit which can be promptly cleared. However, when lightning discharges over an insulator on a grounded neutral system, the resulting short circuit shatters the insulator and severs the conductor. On an isolated neutral system, such flash-overs can be suppressed without damage, but to offset this advantage, actual grounds, due to fallen wires, cause considerable damage before they can be located and disconnected.

In the accompanying drawings.

Figure 1:
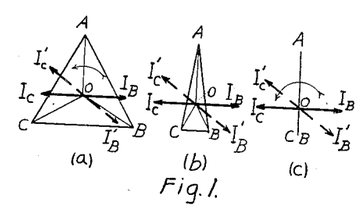
Figures 1, 2, 3 and 4 are used to explain the theoretical requirements of a relay which will clear every form of short circuit on a three-phase network.
Figure 2:
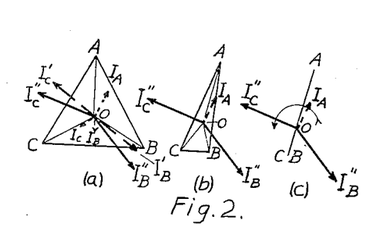

Figs. 1 and 2 show in a rather incomplete way the vector relations on a single 3-phase electric circuit when a short circuit is between the two wires B and C. Fig. 1 shows at (*a*) the voltage triangle at the generating station and at (*b*) the voltage triangle some distance from the generating station. At (*c*) is represented the conditions at the short circuit and it will be seen that the long sides of the voltage triangle have closed in together. It will also be observed that the two star voltages OB and OC are in phase. Referring again to (*a*) in Fig. 1, if the circuit has no inductance, the current which flows in to the short circuit will be in phase with the voltage BC as is shown by the vectors $I_B$ and $I_C$. Under such conditions, if three single-phase wattmeter type relays are connected in star very near the short circuit, none of them will operate because the power factor is zero. Since, however, there is always inductance in the circuit, the current will lag somewhat as shown by the vectors $I'_B$ and $I'_C$. The result of this is to cause one of the relays near the short circuit to operate forward and the other one to operate backward. Fig. 2 shows the effect of an inductive load on the system. The load currents are represented by dotted vectors, the short circuit currents by dash vectors, and the resultant current by heavy vectors. The general results of the load current on the system is to make less pronounced the effect due to the short circuit, as will be observed upon comparing (b) in Figs. 1 and 2. In the former case, one of the relays reads backward, but in the latter case both of them read properly.

Figure 3:
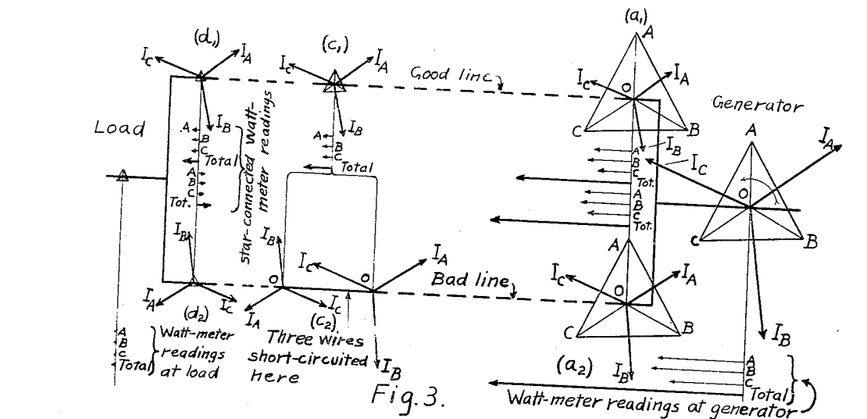
Figure 4:
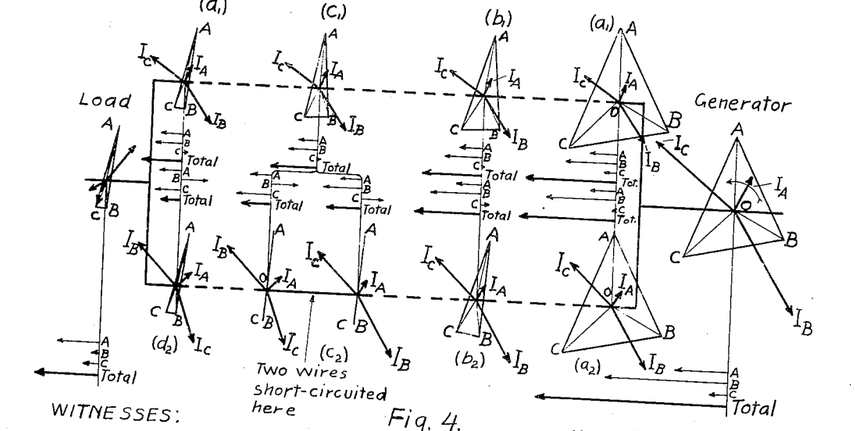

Fig. 3 shows the vector relations and magnitudes of currents and voltages in a three phase system having all three conductors short circuited at the point $C_2$. Fig. 4 is similar to Fig. 3, except that only two conductors are short circuited. The system is represented as consisting of two duplicate feeders connected together at each end with a generator on one end and an inductive load on the other. At the points $a_1$, $a_2$, $b_1$, $b_2$ etc., vector diagrams are drawn showing the condition in the feeder at that point. At $C_2$ are two diagrams, one between the short-circuit and the generator and the other between the short-circuit and the load. Near each vector diagram are shown the comparative readings of single-phase star-connected wattmeters at that point. In Fig. 3 the short-circuit is across three wires and there is consequently no voltage triangle and no wattmeter readings at $C_2$. In Fig. 4 the short circuit is across wires B and C, and the distortion of the voltage triangle is similar to that shown in Fig. 2.

Hence, it follows that star-connected, single-phase relays operating on the wattmeter principle cannot properly clear short circuits occurring between two wires nor can they be depended upon to act properly when connected so as to trip a generator off the bus bars upon a "reversal of flow of power". My experiments have also shown that single-phase short circuits cannot be properly cleared by two wattmeter type relays connected according to the usual "two wattmeter method", or by a polyphase relay connected according to the same method, or by three single-phase relays connected with their voltage coils in delta.

My relay scheme is based upon the following three principles which are seen to hold true in Figs. 1, 2, 3, and 4 and which my investigations show to be true under practically all conditions likely to occur in electrical systems:

I. The current is greater than the normal load current in all wires which are feeding power into a short circuit.

II. The potential between two wires which are carrying current into a short circuit varies from zero at the short circuit to a maximum at the generating station.

III. When a short circuit is across wires A and B, the A wattmeter can always be depended upon to indicate that power is flowing toward the short circuit.

The first two principles apply to any system of alternating or direct current. The third principle applies to a three-phase system and shows that the action of wattmeter type relays depends upon the direction of the rotation of phases. In all the references to the direction of rotation of phases, both in these specifications and in the claims the OA vector is supposed to lead the OB vector as shown by the arrow in the diagrams.

My relay consists essentially of two elements, one of which I call an overload element and the other a watt element. These two elements are mechanically independent of each other, but their tripping contacts are in series so that the coöperation of both is required in order to open a circuit breaker. A three-phase installation consists of three overload and three watt elements.

The watt element is a contact-making wattmeter. On a three phase system the three wattmeters are connected in star.

The overload element has two important functions:

(a) To determine the distance the short circuit is from the relay, and, (b) To determine which watt element is properly indicating the direction of the trouble.

It operates in a time inversely proportional to the current in the circuit and directly proportional to the voltage of the circuit. Or, stated mathematically: time varies as $$\frac{\text{voltage}}{\text{current}},$$

but $$\frac{\text{voltage}}{\text{current}} = \text{impedance}.$$

Hence, the time of operation of the overload element varies with the distance the short circuit is from the relay.

Figure 5:
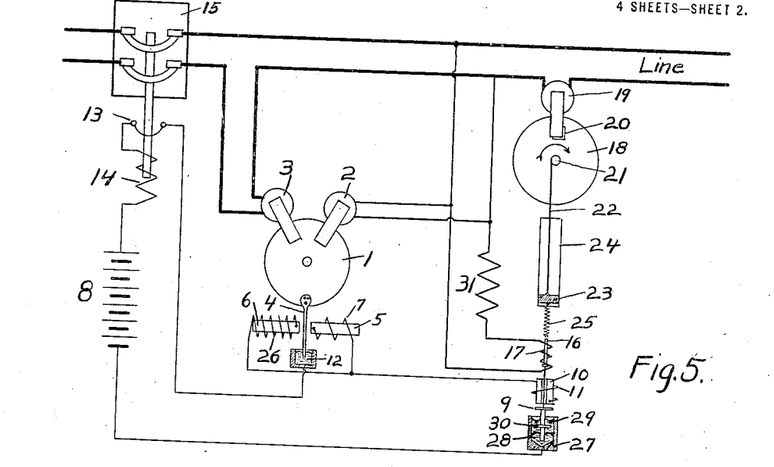
Figs. 5 and 7 illustrate diagrammatically my relay scheme which will satisfy these requirements.
Figure 9:
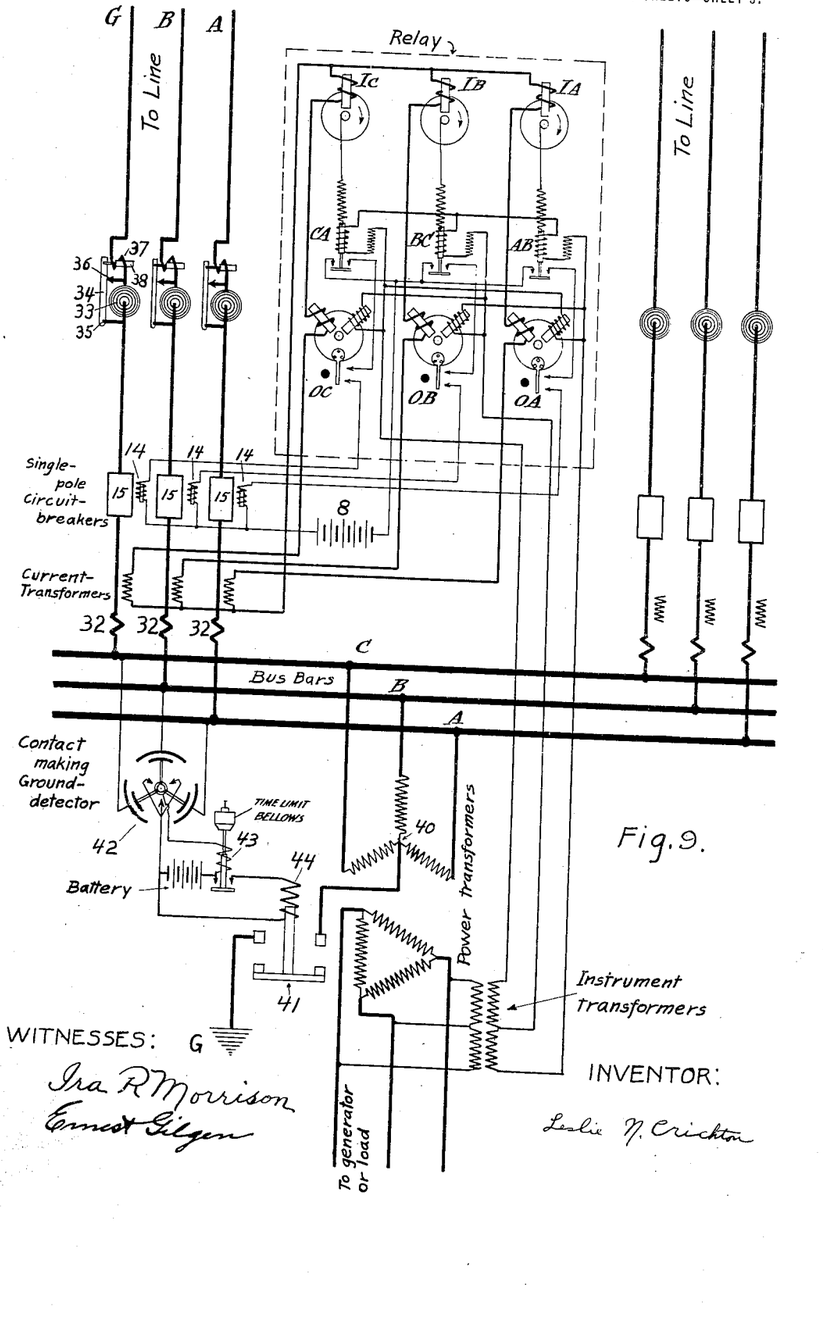
Fig. 9 is a diagram of the relay as applied to a three-phase system together with the auxiliary apparatus required to assist the relay in various extreme cases of short circuit and also the apparatus which minimizes the chances of interruption due to a grounded line.

Fig. 5 is a schematic view of one relay connected in a single-phase circuit. The watt element consists of a pivoted disk 1 of non-magnetic conducting material, acted upon by voltage coil 2 and the current coil 3. According to the familiar Ferraris principle, the disk has a torque produced on it by the reaction of the magnetic fields of 2 and 3 on the disk. The direction of this torque depends upon the direction of the flow of power in the circuit to which the relay is connected. The disk 1 is balanced and is delicately pivoted and has no spring or other restraining force so that it is free to move in either direction when a very small torque is applied. In order to simplify the diagram, the disk 1, in Figs. 5 and 9, is shown mounted on a horizontal spindle, but in practice, it is usually mounted on a vertical pivot and is carefully balanced, so that it will stand in any position. A soft iron armature 4 is fastened to the disk and moves between the two electromagnet cores 5 and 6. When power is flowing away from the sectionalizing station in which the relay is located the armature 4 is against the contact 5. The object of the electromagnet core 5 with its winding 7, is to make a positive contact when the armature comes against the core. The path of the tripping current is from the battery or other source of current 8, through the mercury cup 27 and the contacts 9 and 10 and the coil 11 on the overload element, then to the watt element through the coil 7 to the contact face on the core 5, through the armature 4 into the mercury cup 12, then it goes through the pilot switch 13 and the trip coil 14, both of which are connected to the circuit breaker 15. When the armatures 4 and 9 are moved so as to touch the contact faces of the cores, 5 and 10, the current which flows through the coils 7 and 11 magnetizes the cores 5 and 10 and draws the armatures solidly against the contact faces so that there is no arching possible. When the circuit breaker has tripped open, the switch 13 which is connected to the circuit breaker mechanism, is also opened so that the relay armatures 4 and 9 are released.

The overload element consists of a current-operated device tending to raise the armature 16 on occurrence of an overload and a voltage operated device tending to prevent the armature 16 from being raised. The current-operated device is shown to consist of a disk 18 of non-magnetic conducting material acted upon by the electromagnet 19. This electromagnet is energized by the current flowing through the line and has a shading coil 20 on one pole face so that a torque is produced in the direction indicated by the arrow. The disk is fastened to the shaft 21, upon which the cord 22 is wound whenever the disk revolves. To this cord is attached the piston 23 of such a weight that the disk cannot revolve until the current in the electromagnet has reached overload proportions. If the current is more than sufficient to raise the piston, the speed with which it is raised is limited by the retardation of the air in the dashpot 24. The speed with which the piston is raised varies approximately as the value of the current in the electromagnet 19. An adjustable valve, not shown, is used to regulate the flow of air from the dashpot so that the time setting of the relay can be varied. A spring 25 is hung from the piston 23 and to the lower end of the spring is fastened the contact armature 9 and the core 16. As the disk 18 revolves and stretches the spring 25, the tendency is for the contact armature 9 to be raised, but it is held down by the action of the solenoid 17 pulling on the core 16. As a consequence, the pull of the spring continues to increase until it is sufficient to overcome the pull of the solenoid 17. If the overload is cleared before the core 16 is pulled up, the piston will drop back to its normal position. If the overload continues until the core is pulled up, the contact armature 9 is forced against the contact face of the magnet 10 and if the armature 4 of the watt element is against its contact, the circuit breaker will be tripped.

The solenoid 17 is excited by the voltage of the line so that when the voltage is zero, it will allow the core 16 with the attached armature 9 to rise instantly. When the voltage is above zero, the solenoid will hold its plunger for a length of time depending upon the magnitude of the voltage and the speed with which the string 22 is wound up.

In order that changes in temperature and frequency will not cause large errors and also for the purpose of adjusting the restraining power of the solenoid 17, the series resistance 31 is inserted. It is ordinarily assumed that the pull exerted by a solenoid on its core varies approximately as the second power of the applied voltage. Such a characteristic when plotted volts vs. pull is a parabola and is shown at M in Fig. 6. Such a characteristic in hardly satisfactory for the successful operation of the relay because of the lack of discrimination at low voltage where it is most required. However, my experiments have shown that it is possible to obtain a characteristic curve such as at N. The advantage of this characteristic is that at low voltage where the working forces are small, a slight increase in voltage causes a large increase in pull, so that variations in the operation of the relay due to the friction of the moving core are negligible. Above the point P the curve is straight and is purposely made steeper because the operating forces above that point are so much greater than the friction that there is no variation from that cause.

Figure 6:
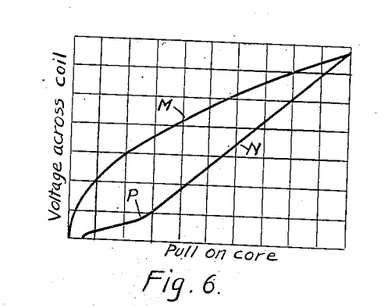
Figs. 6 and 8 are curves which show the characteristics of the relay.
Figure 7:
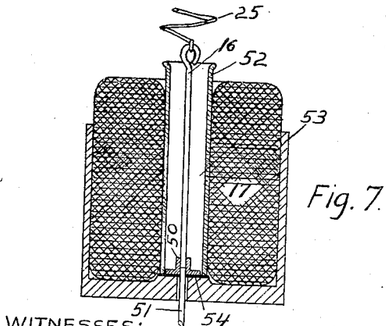

The design of this restraining coil and core is shown in Fig. 7. 17 is the coil and 16 is the core which consists of a piece of annealed iron wire with a piece of soft iron or steel 50, fastened to the bottom. A piece of copper wire 51, is also fastened to the core and connects it to the movable contact below, (9 in Fig. 5). The three pieces 16, 50 and 51 are soldered together but other methods of fastening could of course be used. The piece 50 would work satisfactorily if it were a plain disk, but the boss is formed on top of it in order to get sufficient material to make a good joint with the other pieces. A glass tube 52 is used to provide an almost frictionless guide for the end of the core 50. The coil is surrounded by an iron cup 53. The best results are obtained when the sides of the cup are about ¾ the height of the coil and when the dimensions of the core and coil are of the proportions shown. The bottom of the cup contains a projection which acts as a stop for the core. On the top of the stop is a thin sheet of non-magnetic material 54, the object of which is to prevent the core from sticking to the stop due to residual magnetism, or similar causes. The hole in the bottom of the cup through which the wire 51 passes is too small to affect the operation of the magnet. The core 16 is saturated at a comparatively low value of the current in the coil. This accounts for the fact that the upper part of the curve N in Fig. 6 is straight, but I can not satisfactorily explain the straight line below the point P.

Referring again to Fig. 5, when the armature 9 is raised into contact, a small amount of current is sent through the high resistance winding 26 if the armature 4 is against the contact face of the core 6. The current through this winding also goes through the trip coil of the circuit-breaker and the resistance of the winding must be high enough so that the current it takes will be insufficient to trip the circuit-breaker. The object of the coil 26 is this:

In a complicated network, a sectionalizing station may have three or more lines entering it. If a short circuit occurs near the sectionalizing station, the voltage is very low and the overload elements on all the lines which are carrying a short circuit current will operate. However, the watt elements on the good lines will be working backward (with the armature 4 against the core 6) and will not allow the circuit breakers on the good lines to trip. As soon as the short circuit is cleared, the flow of power may be in such a direction that a watt element on one or more of the relays will try to reverse. The electromagnet 6 with its winding 26 will not allow the watt element to reverse until the armature 9 on the overload element has dropped down to a safe position.

At times the magnetic contacts will be required to operate with very small working forces. If the movable contact is not very flexible any small amount of dust or burned spot on either contact might prevent the current from passing. I secure a flexible contact by using a thin iron or steel armature (say .002 in. thick) and plating it with pure silver or platinum.

In order to conduct the heavy tripping current to the movable contacts on both elements, mercury cups 12 and 27 are used. The cup 27 contains a small amount of mercury 28 and also some glycerin or other non-evaporating liquid 29. In the glycerin is a damping vane 30 which is fastened to the movable contact 9 and prevents it from chattering and also prevents it from closing when the relay is accidentally struck or jarred.

In my invention I do not limit myself to the form of apparatus illustrated in Fig. 5. It is evident that the watt element of the relay can be made after the fashion of any other type of wattmeter and still function properly. It is also evident that the watt element is unnecessary in generating stations and other places where there is no chance of power being fed backward in case of trouble. In sectionalizing stations where there are always at least three separate sources of power feeding into the bus bars, the watt elements are unnecessary because the line in trouble will then be carrying a heavier current than either of the others and its relay will consequently work faster.

It is evident that in the overload element any type of current-operated mechanism can be adapted to use in place of the induction disk; other types of time limiting devices can be adapted for use in place of the dashpot; in place of the weight 23, some other means (such as a spring) can be used to prevent the operation of the ammeter element until the current in the line should reach overload proportions; the spring 25 can be shaped in a variety of ways and still function; the voltage-operated device 16 and 17 can be made in many forms; the form of contacts on both elements of the relay may be varied. It is also evident that the most advantageous part of my invention is that the time of operation varies as the voltage. It is not necessary that it also vary inversely as the current, although that is a great advantage. In order that the time of operation be independent of the current, it is only necessary that the overload coil release some constant time device such as a clock train and that this train wind up the string 22, or if the dashpot be omitted the speed of the disk will be very nearly independent of the value of the current.

Figure 8:
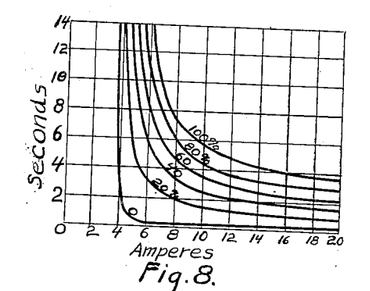

Fig. 8 is a set of curves showing the characteristic action of the relay shown in Fig. 5. The curves are plotted, current vs. time for various percentages of normal voltage. The mathematical equation of these curves should be; current×time=constant, which is a rectangular hyperbola. The curves shown differ slightly from this shape.

The above relay principles are applicable to direct current circuits, and to single-phase or polyphase alternating current circuits.

A three-phase relay consists of three single-phase relays in the same case. Fig. 9 shows the method of connecting a three-phase relay in circuit and also shows the auxiliary apparatus required to enable the relays to clear grounds as well as short circuits, and also to enable them to work properly, no matter how close the troubles are to the station or how close together the stations may be.

It is important that in connecting up the apparatus, the direction of rotation of the phases be taken into account.

The overload elements have their voltage coils connected so as to be acted upon by the delta voltage of the main line. If the step-down transformers are connected delta-delta, the voltage coils of the overload elements are also connected in delta, but in Fig. 9 the step down transformers are connected star-delta so that the voltage coils must be connected in star. Similarly the voltage coils of the watt elements are shown connected in delta, although they are really affected by the star line voltage. Numerous other transformer connections are possible, but the changes required in the relay connection should be evident to anyone familiar with polyphase currents. If a short circuit occurs across two wires, say AB, two of the overload elements will have short circuit currents in their current coils and will start to operate. However, the element having the potential AB will close its contacts long before the other elements can do so because the voltage AB is lower than the voltage on the other elements. It has been shown that when the short circuit is between wires A and B that the A watt element is the only one which can be depended upon to indicate the direction of the short circuit; hence the overload element having the voltage AB has its contact in series with the A watt element. Similarly, the overload element having the voltage BC has its contact in series with the B watt element and the CA overload element is in series with the C watt element.

There is some choice in the arrangement of the current coils of the overload element but generally the current coil of the overload element should be in series with the current coil of its companion watt element.

Figure 11:
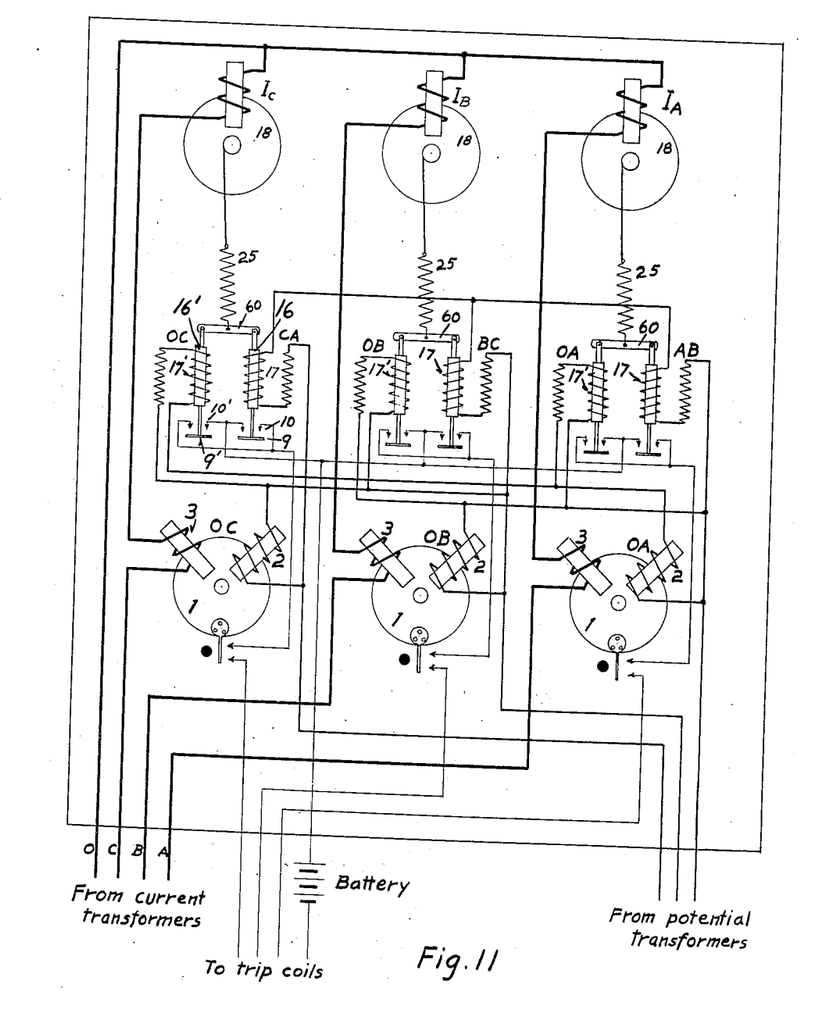
Fig. 11 shows a modification of part of the apparatus shown in Fig. 9.

On a system having a grounded neutral so that a grounded line is a short circuit, the relay scheme described above will work positively enough but it may be slower than desirable when a ground occurs. For such a system the overload elements might have their voltage coils connected in star, in order to get the proper voltage-time characteristic. This could be readily attained without sacrificing any of the advantages of the delta connected voltage coil by fitting each overload element with two voltage coils and armatures as shown in Fig. 11. One of these coils would be connected in star and the other one in delta, but both their armatures would be fastened to the same spring 24, and both would work in coöperation with the same watt element. With such an arrangement, the star connected voltage coil would release its armature in case of a grounded wire, the delta connected coil would release in case of a short circuit across two wires, and both coils would release on all the elements when the three wires were short circuited. In Fig. 11 is shown such a relay, the external connections of which are assumed to be the same as the relay in Fig. 9. The coils 17 are connected the same as in Fig. 9, but the coils 17' are connected so that they are acted upon by the star voltage of the circuit to which the relay is connected. The cores or armatures 16 and 16' are pivoted to a crosspiece, 60, which is attached at its central point to the spring, 25. It is obvious that if all the springs, 25, should be stretched that the voltage restraining coil having the lowest voltage across its terminals would release its armature first. The result would be that the relay would act in the least possible time, irrespective of whether the short circuit occurs between phase wires or between one phase wire and neutral. The reference letters, OC, CA, Ic, etc., show the vectorial relation of the currents and voltages used by the various relay coils.

The watt element requires for its selective operation that there be some potential across the potential coil 2. It is possible to construct a watt element which will operate on a potential of the order of $\frac{1}{10}$ of 1 per cent. of normal. Since trouble frequently happens within a station due to lightning or other accident, it is necessary to provide a means for preventing the voltage from falling below the minimum at which the watt element will operate. This I accomplish by placing a small resistance coil 32 close to the bus bars. Another means of accomplishing the same result is to use conductors having a comparatively high resistance for the station wiring. This resistance is necessary only at substations; at generating stations the drop in the step-up transformers is sufficient if the relays obtain their potential from the low-tension side. I secure such an extreme sensibility of the watt element by making the moving element light, pivoting it on jeweled bearings, balancing it perfectly and by having no restraint of any kind to its motion. The armature will be forced against its contacts or away from them if the torque is sufficient to overcome the friction.

After the tripping circuit of a circuit breaker has been closed, a considerable time elapses before the breaker opens. This time is equal to about ¼ second with present day circuit breakers. If, therefore, two sectionalizing stations are in series, each carrying the same current to a short circuit, it is necessary that the relay nearest the short circuit should act about ½ second quicker than the relay behind it tends to act. This gives a safety factor of 100% in time which is not excessive. Since the assumption is that both relays are carrying the same current, this difference in time must be caused by the action of the voltage coil 17. Suppose that the difference in voltage at the two stations when the short circuit is on is 2%. If a difference in voltage of 2% between the relays causes a difference of ½ second in their time of operation, a voltage difference of 80% between the two would cause 20 seconds difference in their time of operation. If, therefore, a short circuit should be far off or for any other reason give a high voltage at a sectionalizing station, it would take an excessive time to trip off and probably cause synchronous machines to fall out of step. For this reason it is necessary to keep the voltage drop between adjacent sectionalizing stations above a certain minimum. I have concluded from my investigation that the minimum short circuit current for which the relay is set should cause a drop of at least 5% between every sectionalizing station. If the impedance of the line connecting the two stations is insufficient to do this, my invention includes a device for instantly cutting impedance into the line between two such stations upon the occurrence of an overload. 33 is an impedance coil inserted in the line. 34 is a switch blade pivoted at 35 and engaging with the contact jaw 36 in such a way that the impedance coil is normally shortcircuited. On the occurrence of an overload, the solenoid 37 draws in the plunger 38 and thus pushes the switch blade 34 from its clip 36 and forces the current to go through the coil 33. This construction is not essential and for high voltage service would usually consist of an impedance coil shunted by an ordinary automatic oil switch which would be tripped open when an overload occurred.

Fig. 9 also shows the auxiliary apparatus necessary to enable the relay to disconnect a grounded section of line. As before mentioned, it is much better to have an isolated neutral on overhead systems so that a flashover on an insulator will not cause heavy damage. I do not claim or illustrate any method of suppressing an arcing ground, but my invention includes a method of disconnecting a section of line which remains grounded for a definite predetermined time. This I accomplish by placing a switch between the transformer neutral and ground and closing this switch whenever a ground occurs which should be disconnected. As soon as the switch is closed a short circuit is produced and the relays will locate the trouble and disconnect the faulty section of line.

In Fig. 9, 40 represents the neutral of the power transformers and 41 represents the switch between it and ground. 42 is a contact-making ground detector which may consist of any familiar electrostatic ground detector with the addition of electrical contacts which will close a circuit whenever a ground occurs on the transmission line. When this circuit is closed, it operates a definite time-limit relay 43 which in turn after a predetermined time closes another circuit which closes the switch 41 by means of the solenoid 44. There are numerous types of ground detectors, definite time limit relays and switches on the market which can be used to fill all the requirements of items 41, 42 and 43 in my invention, and I make no claims to any of these details.

In Fig. 9 the circuit breakers 15 are shown to be single pole. This is not essential but on long distance transmission lines, particularly parallel lines which are subject to the same lightning discharges, it will improve service because in case of a ground, only the single conductor will be cut out.

The prominent points of advantage my invention has are:

I. The watt element of the relay has no mechanical restraint so that it can be operated by a very low percentage of normal voltage.

II. This small force which is available is perfectly satisfactory because of the magnetic contacts which insure that after the tripping circuit has once been closed by the relay, there will be no arcing or other trouble at the contacts.

III. The time of operation of the relay is dependent on the voltage at the relay which prevents interference between relays.

IV. For use on a three-phase system, the elements of the relay are so grouped that its operation is correct under all conditions of balanced and unbalanced short circuits.

V. In distribution systems where the amount of power handled is very large, considerable difficulty is experienced due to the failure of circuit breakers to handle the enormous short circuit currents. In such systems it is usually attempted to so adjust the relays that the circuit breakers nearest the trouble are opened first, thus throwing a considerable length of line between the trouble and the last circuit breaker which is to open. Due to the large number of variables entering into the combination, this adjustment of the relays is difficult. My invention performs this function inherently because the time required for a relay to clear a short circuit depends directly upon the distance the short circuit is from the relay.

VI. Arcing grounds due to lightning flashing over insulators can be eliminated from the system by well known methods before they have done much damage, but if a ground occurs which cannot be eliminated in a reasonable time, my invention includes apparatus which will disconnect the bad section of line from the system.

Figure 10:
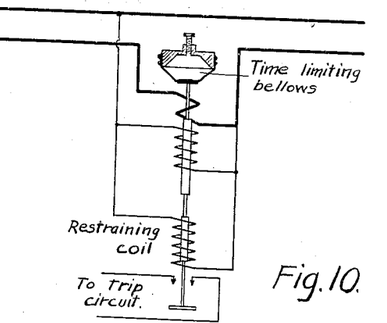
Fig. 10 is a diagram of a simple form of the relay.

The method of utilizing the characteristic condition of low voltage during times of trouble in order to make relays discriminating can readily be applied to relays of existing types. For this purpose, a voltage restraining coil would be so connected as to restrain the movement of the relay except when the short circuit current is above a certain value and the voltage is below a corresponding value, in which case the voltage coil would be overpowered and the relay would act with a speed depending upon the difference in value of the two opposing forces and the amount of damping used. It is theoretically possible to adjust such a combination so that it will instantly cut out trouble between itself and the adjacent sectionalizing station and will not trip out on trouble which is beyond the next station. Practically, however, some little time element is necessary. This device can be used on many electrical systems with perfect success but can not be used universally as can the relay illustrated in Fig. 5. Fig. 10 shows a reverse power (current) relay such as is now extensively used, equipped with a voltage restraining coil. Similarly the voltage restraining coil can be applied to an ordinary overload relay.

It was pointed out in the first part of these specifications that reverse power relays will almost invariably work incorrectly when two wires of a three-phase system are short circuited. The use of a voltage restraining coil as shown in Fig. 10 will prevent such incorrect operation if the restraining coils in a set of three relays are connected in delta and the actuating voltage coils in star as shown in Fig. 9. Such a relay will require less mechanical restraint than is now used and as a consequence the limit in voltage below which it will not work will be materially lowered.

I claim as my invention:

1. In a three phase system of electrical distribution, the combination of three single phase reverse-energy relays equipped with restraining devices energized by the potential of the circuit, the three actuating elements of the relays having their potential coils connected in star and the three restraining devices connected in delta, substantially as described.

2. In a three-phase system of electrical distribution, the combination of three single phase protective relays, each relay consisting of a watt element and an overload element, the overload element having a restraining device operated by the potential of the circuit, the three watt elements having their potential coils connected in star and the restraining coils of the overload elements being connected in delta, substantially as described.

3. A protective relay consisting of the combination of two elements, one of which is a watt element which indicates the direction of flow of the power in the circuit to be protected, and the other of which is an overload element whose time of operation varies according to the value of the voltage in the circuit; the coöperation of both elements being necessary to open the circuit breaker.

4. A protective relay consisting of the combination of two elements, one of which is a watt element which indicates the direction of flow of the power in the circuit to be protected, and the other of which is an overload element whose time of operation varies according to the value of the voltage in the circuit and varies inversely according to the value of the current in the circuit, the coöperation of both elements being necessary to open the circuit breaker.

5. In a three-phase system of electrical distribution with the neutral designated as O and the conductors designated as A, B, C with the rotation of phases in the order A, B, C as shown in Fig. 1, the combination of three single-phase protective relays designated as Nos. 1, 2 and 3, each relay consisting of a watt element and an overload element and requiring the coöperation of both elements to open the circuit breaker, relay No. 1 using in its watt element the voltage vector O A and the current vector O A, and having its overload element operate in a time proportional to the value of the voltage vector A B upon the occurrence of an overload between conductors A and B; relay No. 2 using in its watt element the voltage and current vectors O B and having its overload element operate in a time proportional to the value of the voltage vector B C upon the occurrence of an overload between conductors B and C; relay No. 3 using in its watt element the current and voltage vectors O C and having its overload element operate in a time proportional to the value of the vector C A upon the occurrence of an overload between conductors C and A.

6. In a three-phase system of electrical distribution with the neutral designated as O and the conductors designated as A, B, C with the rotation of phases in the order A, B, C as shown in Fig. 1; the combination of three single-phase protective relays designated as Nos. 1, 2 and 3, each relay consisting of a watt element and an overload element and requiring the coöperation of both elements to open the circuit breaker, relay No. 1 using in its watt element the voltage vector O A and the current vector O A and having its overload element operate in a time directly proportional to the value of the voltage vector A B and inversely proportional to the value of the overload current vector O A relay No. 2 using in its watt element the current and voltage vectors O B and having its overload element operate in a time directly proportional to the value of the voltage vector B C and inversely proportional to the value of the overload current vector O B, relay No. 3 using in its watt element the current and voltage vectors O C and having its overload element operate in a time directly proportional to the value of the voltage vector C A and inversely proportional to the value of the overload-current vector O C.

7. In an electrical circuit, the combination with a circuit interrupter, a tripping means therefor, and two switches for controlling the tripping means, of star-connected watt relays for actuating one of the switches, star-connected overload relays for actuating the other switch, and delta-connected means for restraining the operation of the overload relays.

8. The combination of a three-phase electrical distribution system equipped with overload relays at various points, a star connected generator or bank of star connected transformers, a switch between the generators or transformer neutral and ground, means for detecting a ground on the system and means for automatically closing the switch a short predetermined time after a ground occurs on the system, the object of the operation being to cause the grounded line to become a short circuit so that the proper protective relays will select and cut out the bad section of line.

9. In an electrical circuit, the combination with a circuit interrupter, a tripping means therefor, and two switches for controlling the tripping means, of star-connected watt relays for actuating one of the switches, star-connected overload relays for actuating the other switch, and delta-connected potential-responsive means for restraining the operation of the overload relays.

10. In an electrical circuit, the combination with a circuit interrupter, a tripping means therefor, and two series-connected switches for controlling the tripping means, of a relay comprising a watt element for actuating one of the switches, an overload element for actuating the other switch and restraining means for the overload element, said restraining means being so connected to the circuit as to permit operation of the overload element when the potential thereon decreases because of a reversal of the energy in the circuit.

11. In a polyphase electric circuit, the combination with circuit interrupters and pairs of series-connected means for controlling the respective trip coils thereof, of means responsive to reverse energy in the circuit for actuating one of the series-connected means, means responsive to overloads for actuating the other series-connected means, and means for controlling the operation of the overload-responsive means in accordance with the potential of the circuit.

12. A relay system for a polyphase electric circuit comprising watt relays having current and potential windings thereon, overload relays having current windings thereon, potential-responsive means for opposing the operation of the overload relays, said potential-responsive means being so connected to the circuit that the current traversing the same shall lag thirty degrees behind the current traversing the respective phases of the circuit.

13. In an electric circuit, the combination with a circuit interrupter and a trip coil therefor, of two series-connected switches, a watt relay for actuating one of the switches, an overload relay for actuating the other switch, and means for restraining the operation of the overload relay in accordance with the potential of the circuit.

14. In an electric circuit, the combination with a circuit interrupter and a trip coil therefor, of two series-connected switches, a watt relay for actuating one of the switches, an overload relay for actuating the other switch, and means for so retarding the operation of the overload relay that its time of operation varies in accordance with the potential of the circuit.

15. In an electric circuit, the combination with a circuit interrupter and a trip coil therefor, of two series-connected switches, a watt relay for actuating one of the switches, an overload relay for actuating the other switch, means for restraining the operation of the overload relay in accordance with the potential of the circuit, and resilient means interposed between the restraining means and the overload relay.

16. In a polyphase electric circuit, the combination with a plurality of circuit interrupter and watt relays for controlling the tripping thereof when the energy reverses in the circuit because of a short circuit or ground, of means dependent upon the location of the short circuit or ground for selecting the proper watt relay.

17. In a polyphase electric circuit, the combination with a plurality of circuit interrupters and watt relays for controlling the tripping thereof when the energy reverses in the circuit because of a ground or short circuit, of means dependent upon the drop in potential between the ground or short circuit and the relays of the respective phases of the circuit for selecting the proper watt relay.

In witness whereof, I hereunto subscribe my name this 4th day of December, 1912.

LESLIE N. CRICHTON.

Witnesses:
 IRA R. MORRISON,
 ERNEST GILGER.